March 18, 1969 F. PFLEIDERER ET AL 3,433,899
TDM SYSTEM WITH MEANS FOR CROSSTALK REDUCTION BY CHANGING THE SLOT POSITIONS OF THE CHANNELS AFTER EACH FRAME PERIOD
Filed Sept. 23, 1964 Sheet 3 of 6

United States Patent Office 3,433,899
Patented Mar. 18, 1969

3,433,899

TDM SYSTEM WITH MEANS FOR CROSSTALK REDUCTION BY CHANGING THE SLOT POSITIONS OF THE CHANNELS AFTER EACH FRAME PERIOD

Friedrich Pfleiderer, Munich-Solln, and Max Schlichte, Munich, Germany, assignors to Siemens Aktiengesellschaft, Munich, Germany Filed Sept. 23, 1964, Ser. No. 400,604
Claims priority, application Germany, Sept. 23, 1963, S 87,451
U.S. Cl. 179—15 23 Claims
Int. Cl. H04j 3/10

ABSTRACT OF THE DISCLOSURE

For minimizing intelligible crosstalk between the individual channels of a pulse time multiplex communication system, the pulse phases made available for each of a group of $n$ successive time channels during each system scanning period defined by appearance of all time pulse phases are constantly changed such that the time channels appear in all $n(n-1)$ possible combination pairs as directly adjacent time channels at equal frequency of appearance of at least $n(n-3)$ combination pairs and the remaining, at most $2n$, channel combination pairs appear at a greater frequency of occurrence.

This invention relates to a time multiplex long distance communication system, and in particular a telephone exchange system in which the messages to be exchanged between different subscriber's stations are individually modulated on various impulse successions which are time displaced from each other and interleaved together on a multiplex highway, so that they can be temporarily bunched or bundled together. In order that such pulse modulation and bundling may be possible, with later separation of the pulses, so-called time filters are necessary. Such time filters consist of switches which are controlled in such a way that, in principle, they conduct infinitely well during an impulse period sufficient for the scanning procedure, and that they block infinitely well in the intervening long intervals.

The electronic time filters which are now employed in time multiplex communication systems approach the ideal switch only in an imperfect manner. Their conductivity and availability to block are not perfect, but rather the transition from conductivity into blocking condition, and vice versa, does not occur instantaneously. Such deficiencies can lead in a time multiplex communication system to a decreased availability of pulse slots, or a decreased packing density, since an electronic switch associated with a certain end station exhibits substantial conductivity at times other than when the station is to be connected with the highway. In particular, if the switching speed in going from a conducting to a blocking condition is not sufficient, the result may be inadequate selection with respect to the immediately-following time channel. Such an inadequate time selection has as its consequence crosstalk between the two successive time channels.

Another type of crosstalk which can arise in a time multiplex system results from the continued existence of one communication signal for an appreciable time after the next signal is switched to the multiplex highway. This may occur by reason of the characteristics of the transmission network, by which the oscillations or changes in the voltage of any signal cannot decay immediately, when the signal is switched away from the highway.

Crosstalk between different time channels of a time multiplex communication system is especially significant with respect to immediately adjacent channels, whereas there is an insignificant degree of crosstalk between time channels which are remote from each other in time. That is, the intelligible crosstalk or incorrectly coupled voltage is minimal for remote channels. In general, however, long distance communication systems must meet the requirement that no intelligible or disturbing crosstalk appears between any two channels, including immediately adjacent channels. In this connection, it has been found desirable that the intelligible crosstalk be equally reasonably low throughout the entirety of the channels. That is, for all channel pairs, the intelligible crosstalk must be suppressed in like manner.

In order to decrease crosstalk between channels it is known in open air line transmission systems in which channels are bundled together, to provide double twisted lines or parallel wire lines crossed at the supporting poles, so that the crosstalk between lines may be compensated for by the crosstalk couplings. In this connection reference may be made to Haak: "Introduction to Line Technique," Third Ed., p. 97, and also to Klein: "The Theory of Cross Talk In Lines," 1955, p. 90.

It is also known that long distance communication systems having transmission channels which are spatially separated from one another can be isolated for secrecy purposes, by cyclic alternation of message transmission through the different lines.

In a time multiplex system, in analogy to the cyclic alternation of lines separated by space, it has been suggested that secrecy be maintained by a temporary mixing of the transmitted pulses. In this connection, a previously known time multiplex system employs a travel time chain whose taps are connected by way of electronic switches into an outlet. In order to alternate the succession of pulses, such electronic switches are controlled in a certain succession by switching pulses, which pulses are provided with the aid of further travel time chains. However, such travel time chains have noticeable side effects.

In order to avoid noticeable effects such as crosstalk in an impulse mixing process, using transit time links or travel time chains, and yet with secrecy provision, it has previously been suggested to provide a control arrangement for each of the transmission and reception equipment, to control switches providing for the scanning of the channel signal voltages, or for their division into the various channels, such switches being actuated in time-changing succession at an alternating frequency chosen in dependence upon the average switching frequency of the switches (that is, the scanning frequency). In order to reduce perasitic voltages, either the alternating frequency should be very low, that is, the pulse succession should be changed correspondingly fewer times, or the chosen scanning frequency selected in accordance with the scanning program should be doubled, so that the limitation on the connection frequency is eliminated.

Another suggested time multiplex system makes possible secrecy without transit time links which cause crosstalk, such system providing at each of the sending and receiving ends a special circuit for pulse code modulation, including a known storage and synchronized switching means operable to uncode at least two code-modulated impulse trains which are interleaved with each other. This special circuit, on the emitting side periodically scans the message voltages simultaneously, in all channels, and conveys the scanning values to the storage means from which they are picked up in a time-changeable succession under the control of a coding program apparatus. At the reception end, this special circuit distributes the amplitude-modulated impulses, after proper decoding, to the storage means associated with the individual channels.

Furthermore, in order to decrease crosstalk in a time multiplex system it is known (see Hoelzler-Holzwarth, "Theory and Technique of Pulse Modulation," pp. 55, 83, 107–111, 338–347), to adjust the transmission network in accordance with measurements thereof in such manner that the continued vibrations of one signal go to zero in time coincidence with the initiation of the next pulse phase. Such procedure however requires on the one hand, in addition to a special construction of the transmission network with sufficient control over its electrical characteristics, a high degree of accuracy of the synchronization of the pulses which are interleaved. On the other hand, such a system makes possible only the decrease of crosstalk appearing as a consequence of the continued presence of vibrations in a transmission network after the corresponding signal voltages are switched off.

It has also been suggested in the past to ground the multiplex highway or transmission line of a time multiplex telephone exchange system, in the intervals between two pulse phases, since the capacity to ground of such a system cannot be neglected. In such fashion undesired loading of the multiplex highway can be avoided, so that crosstalk due to such loading may be eliminated.

The present invention provides a new way in which intelligible crosstalk caused by storage effects between different channels of a time multiplex communication system may be decreased. With the method of the invention such decrease is especially effective between immediately adjacent time channels, so that messages transmitted in one time channel cannot be understood in another time channel. The invention concerns a time multiplex communication system wherein the pulses of the pulse successions are time interleaved with each other by actuation of time channel switches forming the connections, in a time changing succession. In accordance with the invention, in order that the intelligible crosstalk between successive individual time channels of the time multiplex system may be decreased, the time slot assignments of the different signals is alternated regularly in such fashion that at least nearly all pair combinations of time channels appear equally in all possible combinations of time relationship, in both frequency and duration. That is, nearly all of the possible combinations of channel pairs appear as remote as possible from each other in time just as frequently and for the same duration as they appear immediately adjacent each other. Moreover, the same relationship exists for all intervening time relationships. As a result of the invention any intelligible crosstalk caused by storage effects between the various time channels of the communication system, and also of another similar time multiplex communication system, is decreased in equal fashion among the various channels, independently of the causes of the crosstalk.

This decrease in crosstalk is effected by several causes which support each other. First, two signals which at one time are immediately adjacent each other, do not continue to be immediately adjacent each other but rather to succeed each other at greater intervals in dependence upon the regularity with which the change of the different phase conditions of the channels takes place. Accordingly, the crosstalk between two such channels is decreased in its average time value, as compared to the crosstalk which would occur if the channels were maintained in immediate adjacency at all times. Consequently, the transmission level of the crosstalk between any two time channels is decreased. Further, since the time displacement between certain time channels changes with time, the one channel of any two sets of channels, in effect, is scanned by the other channel, and the period of immediate adjacency during any time sequence is correspondingly prolonged. Due to the "scanning" effect, only signal energy of a frequency band which is reduced in accordance with the scanning program reaches the other time channel free of distortion. In such fashion the information which is translated from one time channel to the other, as opposed to the information transmitted between two end stations participating in a connection, is considerably altered, so that the intelligibility of the crosstalk is reduced.

Both of these effects are further augmented by the fact that the crosstalk components from each time channel into another channel are obscured by the crosstalk components from all other time channels, since, during a period of alternation of the positions of the channels, any two channels appear equally in all possible time relationships to each other.

A further advantage of the system of the invention is that fewer control devices are required to perform the regular changes in the phase positions of the time channels in accordance with the invention, as opposed to an alternation which takes place in a greater time period. This occurs because the successions in which the pulse phases are occupied by the time channels can be repeated with a correspondingly shorter period, and at the same time it is possible to obtain greater accuracy of timing for such correspondingly shorter time periods. Moreover, with the regular changes in the phase positions achieved with this invention, no impulse noise of disturbing characteristic appears such as to be particularly distinguished by, and therefore be disturbing to, the ear. In contrast, with the system of the invention, the use of a higher switching frequency provided by a doubling of the scanning frequency with the same number of time channels, would lead to a shorter time interval between the time channels and thus to the decrease in the suppression of the crosstalk between the time channels.

In the system of the invention, it is advantageous that all time channels possess the same average channel scanning period, representing the system scanning period T. This makes possible uniform control of the entire time multiplex communication system in accordance with the system scanning period T and thus contributes to avoiding disturbance of the signals by adverse influences on the transmission paths. Further, such relationship enables equal occupation of the several pulse phases available for the bundling together of the transmission channels. In this connection, the *channel* scanning period is defined as the time interval between the successive scanning times of the time channel being considered. In other words, it is the period of time between the pulse phase assigned to the channel in question, in a particular *system* scanning period T, and the pulse phase assigned to that same channel in the following *system* scanning period.

It is appropriate that the pulse phases occupied by individual time channels in the succession described above be repeated during a period which constitutes a whole number multiple of the system scanning period T. In order that all pair combinations of time channels associated with the connection appear immediately adjacent each other with equal frequency and duration (that is, that such combinations of channels appear in all time relationships, including immediate adjacency, with the same frequency and duration), the succession in which particular pulse phases are covered by the same time channels must have a period which equals $(n-1)\times T$ or a multiple thereof, wherein $n$ represents the number of the time channels available for the connection, and T represents the system scanning period. It will also be shown hereinafter that the same relationship can be obtained for *almost* all pair combinations of two time channels wherein the repetition of channels defined above is a multiple of $n$ by T, if a pulse phase is provided which is not included in the change of phase positions of the individual time channels.

Such occupation of the pulse phases in the given time succession makes possible the use of spatially separated, synchronously operating control systems, providing for the change in pulse phases. Such separated systems will be required in time multiplex transmission systems for both sending and receiving. However, in a time multiplex telephone system it can be that only one such control system is necessary. If this be the case, it can also be possible that most phases be occupied by the individual channels in statistical succession in each system scanning period T.

The change in phase position of the individual time channels can be performed either after the pulse modulation involved in the time multiplex operation or simultaneously with that pulse modulation. In the latter case, of course, the combination of processes can be performed at the individual end stations of the time multiplex communication system. Moreover, in the latter case, providing for simultaneous operation, it is especially possible that (in accordance with a further development of the invention), the instantaneous channel scanning period $t$ for each time channel $k$ may deviate only in the smallest possible time duration from the system scanning period T, so that the fluctuations caused by the deviation do not adversely influence the signal transmission in the particular time channel to an inadmissible degree.

By reason of the fact that the instantaneous channel scanning period $t$ differs from the systems scanning period T by a minimum amount, the reactances present in the involved connection path are in energy conditions after each instantaneous channel scanning period $t$ which deviate from the energy conditions which would exist if the instantaneous channel scanning period $t$ was equal to the system scanning period T, only by amounts which do not cause undue disturbance between the channels. In this fashion any disturbing influence on the connection in question, for example through echo suppression, is avoided. Such a disturbing influence is particularly avoided if the instantaneous channel scanning period $t$ deviates from the scanning period T by no more than the time interval tau of two instantaneously adjacent time channels $j$, $k$. In the case that the changes in pulse phase assignment occur simultaneously with the modulation process, with two successive channel scanning periods $t$ differing from each other in their length by the shortest possible time span, disturbances produced by instantaneous changes in the channel scanning period $t$ do not adversely influence the signal transmission in the involved time channel to an inadmissible degree. With these changes kept to a minimum, disturbance vibrations which could lead to an adverse influence on the intelligibility of the transmitted message, are kept to negligibly small amplitudes. This is achieved by undertaking the changing of the pulse phases $p$ in such manner that for each individual time channel, the momentary channel scanning period $t$ is just as long as the preceding channel scanning period, or just longer or just shorter than the preceding channel scanning period thereof by the time interval tau of two successive pulse phases, in such fashion that the system cycle (wherein the system scanning period T is subdivided in each case in pulse phases $p$ occupied by a time channel $k$) can be maintained continuously for all system scanning periods.

An especially advantageous system in accordance with the invention, which system possesses the aforementioned characteristics and the advantages thereof, is as follows: during successive system scanning periods T, the pulse phase positions of, say, the odd-numbered time channels, are increased by one phase channel, while the remaining channels are decreased in phase position by the same amount. This holds true until the phase position of the respective time channel becomes either the last or the first position in the sequence. In such case, the phase position remains the same for two successive system scanning periods T, whereupon it increases or decreases by one phase position, depending upon whether it had previously decreased or increased, respectively. That is, if the time channel is in the last pulse phase, it will remain there for two successive scanning periods and will then go to the next to the last pulse phase, whereupon it will continue to decrease in phase position until the first phase position is reached.

The invention will now be more fully described in conjunction with drawings showing preferred embodiments thereof.

Figure 1:
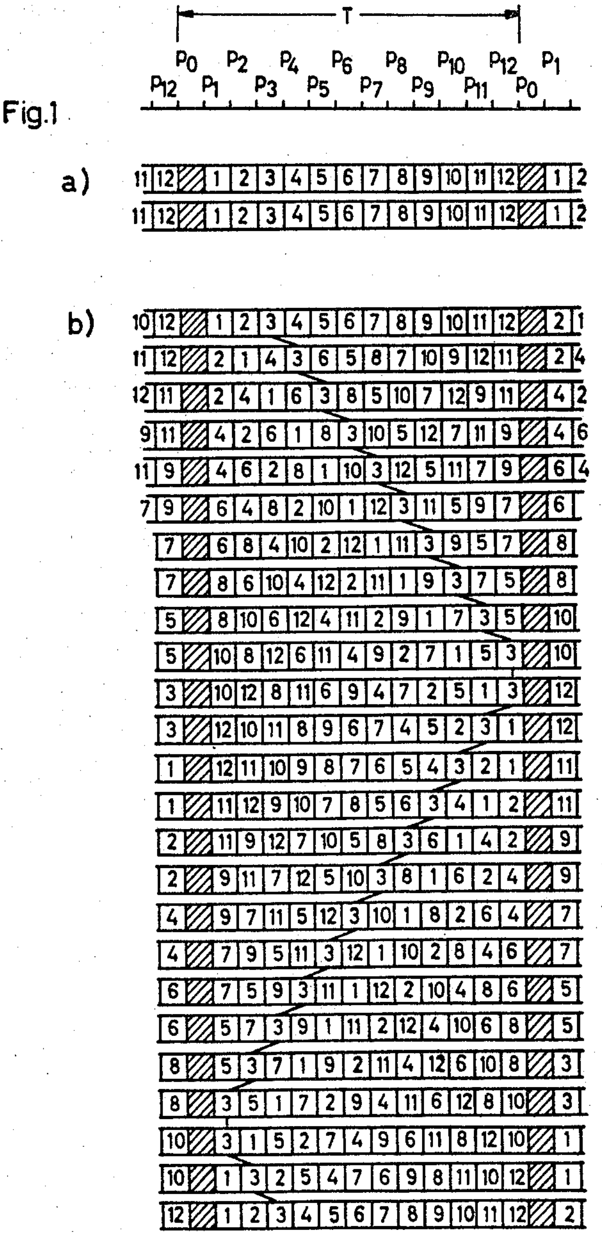
FIG. 1 is a diagrammatic representation of the pulse phase positions and relative time channel positions for both the conventional time multiplex communication system, and such a system operated in accordance with the invention.

Referring first to FIG. 1, the representation at the top of the figure is of the pulse phase positions for a 12 channel multiplex communication system, using message channels between pulse phases $p_1$ and $p_{12}$ with the pulse phase position $p_0$ retained for a purpose to be described. The system scanning period T includes all of the phase positions $p_0$ to $p_{12}$.

The representation of FIG. 1*a* is of the ordinary time succession in a time multiplex communication system. wherein the time channels follow each other at the system scanning period, in all periods of the operation of the apparatus. The upper line indicates one of the scanning periods and the immediately adjacent lower line represents the next scanning period.

In contrast, FIG. 1*b* represents the sequence of time channel positions, according to pulse phases, in a time multiplex communication system operated in accordance with the invention. In this representation the successively lower lines represent successive system scanning periods T. If the time channel 3 is followed through the sequence of scanning periods, it will be seen that its position successively advances by one pulse phase position, until it reaches pulse phase position $p_{12}$. Then, it remains in that pulse phase position for two successive system scanning periods T, whereafter it decreases the number of its pulse phase position in successive scanning periods until it reaches pulse phase position $p_1$. Then it remains in that postion for two successive scanning periods, whereupon its pulse phase position increases in number by one pulse phase position during each successive system scanning period T. As indicated by the representation, this type of advance is repetitive, in accordance with the general sequence outlined above.

In contrast to the succession of phase positions of time channel 3, channel 4 will be seen to decrease in numbered position when channel 3 is increasing, and vice versa. In fact, it will be seen that all of the odd-numbered channels first increase in pulse phase position and then decrease in pulse phase position, while all of the even-numbered channels first decrease in pulse phase position and then increase. Moreover, this progression holds true for each one of the channels until it reaches either the first or the last pulse position, whereupon it remains in that position for two successive scanning periods T and then changes the direction of its progression.

Generalizing from the specific instances so far described, it will be seen that the individual pulse phases $p_1 \ldots p_n$ are occupied by the time communication channels in successive system scanning periods T such that a succession of pulse phases $p_{i-1}$, $p_i$, $p_{i+1}$ . . . (where $i$ is even) are occupied in the first system scanning period T by communication time channels $k$, $k+1$, $k+2$, $k+3$ . . ., and in the next system scanning period by the succession of channels $k+1$, $k$, $k+3$, $k+2$, . . . It will be appreciated that the channel number $k$ is the same as the pulse phase occupied thereby in the first scanning period T of the example furnished by FIG. 1*b*. Also, it should be appreciated that, for odd-numbered values of $k$, successive pulse phases $p_k$, $p_{k+1}$, $p_{k+2}$, $p_{k+3}$ are occupied first by channels $k$, $k+1$, $k+2$, $k+3$ . . ., and in the following system scanning period successive pulse phases $p_{k+1}$, $p_k$, $p_{k+3}$, $p_{k+2}$, are occupied by channels $k+1$, $k$, $k+3$, $k+2$. . . . Of course, with respect to the first and last pulse phases, exceptions are provided, since such phases are occupied twice in succession by the same time channel.

Generally speaking, the successive time channels $k$, $k+1$, $k+2$, $k+3$ . . ., which, during a system scanning period T, occupy the phase positions $p_k$, $p_{k+1}$, $p_{k+2}$, $p_{k+3}$ . . ., in the following system scanning period each occupy either the next succeeding or the next preceding pulse phase, in a logical progression. That is, this progression continues until the time channel in question occupies either the first or the last pulse phase, whereupon, after occupation of that pulse phase for two successive scanning periods, the direction of progression is reversed.

As a result, it is found that the sequence of the pulse phase occupation by the individual time channels repeats itself in a period of length $2n$T in such fashion that a time channel (which in the ordinary pulse multiplex system would immediately follow the same channel at all times) in accordance with the invention immediately follows one channel only twice, and of course immediately precedes it twice. While, without the application of the method of the invention described in conjunction with FIG. 1, a total of $n$ different time channel combinations would appear $2n$ times immediately adjacent each other within the time span $2n$T, whereas with the invention, within the same period, a total of $n \times (n-1)$ time channel combinations would appear basically two times in such relative positions. However, with an even number $n$ of time channels, $2n$ time channel combinations repeat once in the time span $2n$T and, with an odd number $n$ of time channels, $n$ time channel combinations each repeat twice, whereby the change of phase positions of the individual time channels $1 \ldots n$ is such that approximately all possible pair combinations $jk$ of any two time channels $j$ and $k$ appear with like frequency and like direction immediately adjacent each other. Expressing the foregoing in mathematical terms, for an even number $n$, the number of time channel combinations occurring only twice in the time $2n$T, or as may be expressed, at equal frequency of occurrence and duration, is:

$$n(n-1)-2n=n(n-3)$$

The remaining $2n$ combination pairs thus occur at a higher frequency of occurrence, namely three times within the period $2n$T, as compared to the pairs $n(n-3)$. Similarly, for an uneven number $n$ of time channels, $n$ time channel combinations occur a total of four times and $$n(n-1)-n=n(n-2)$$

combination pairs occur two times during the period $2n$T.

Turning now to FIG. 1*b* again, it will be seen that there is inserted into the succession of pulse phases $p_1$, $p_2 \ldots p_{n-1}$, $p_n$, $p_1$ . . ., between the last pulse phase $p_n$ and the first pulse phase $p_1$, a special pulse phase $p_0$. This pulse phase is not occupied by the information channels. This scheme in which a pulse phase in the succession of pulse phases is not employed for a time channel has the advantage that all possible pair combinations $jk$ of two time channels $j$ and $k$ associated with one connection, appear with equal frequency and equal duration immediately succeeding each other. At the same time it is possible to have a permanently available pulse phase with which special control processes, synchronization measures and the like can be implemented.

Figure 2:
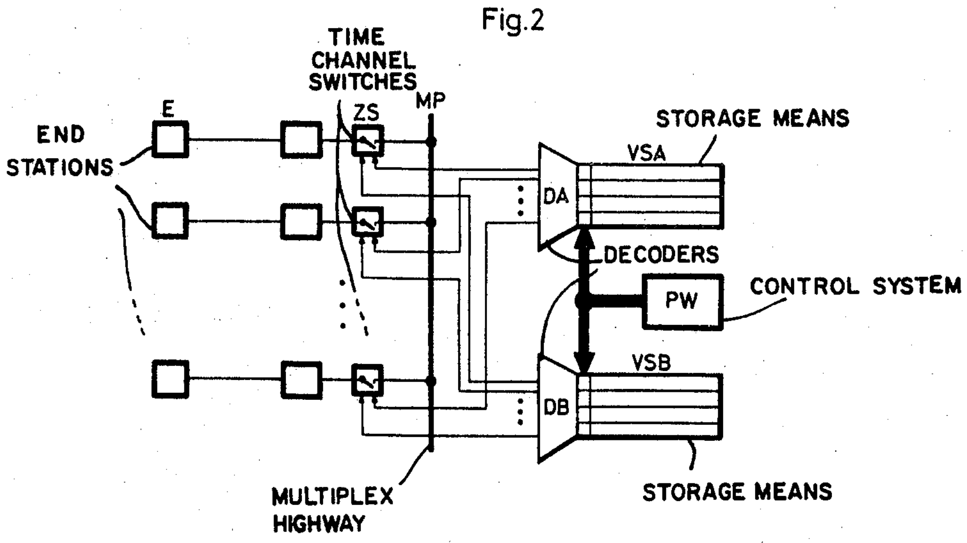
FIG. 2 is a diagrammatic representation of apparatus in accordance with the invention.

Turning now to FIG. 2, that figure shows in diagrammatic form the various elements of a time multiplex system which can be operated in accordance with the invention.

In the system of FIG. 2, end stations E, which may be subscriber telephones and other like terminations, are connected through time channel switches ZS to a multiplex highway MP. The time switches are repeatedly actuated by control pulses which have phases displaced from one another. In such fashion, when the time channel switches of two end stations E are operated to connect the end stations to the multiplex highway MP, a message may be transmitted from one of the end stations to the other.

The control pulses for operation of the multiplex switches may be conducted, with the aid of decoders, from addresses stored in a connection information storage device in which are stored the identifications of the time channel switches ZS which are to participate in connections. In FIG. 2 are shown two partial storage devices VSA and VSB of an information storage apparatus. For instance, the partial storage device VSA may contain the addresses of end stations E from which messages are transmitted (calling stations), while partial storage device VSB may store the addresses of end stations E to which the messages are directed (called stations). A decoder DA or DB is connected at the output of each storage device and is operative upon receipt of the address of an end station E to emit a control pulse at its output associated with that particular end station. The control pulse operates the time channel switch ZS associated with the selected end station.

In addition to the partial control devices VSA and VSB and any other storage devices which may be supplied in a system of this type, the apparatus of FIG. 2 is provided with a control system PW. This control system provides control commands which control the transmission of the stored addresses in the storage devices VSA and VSB through the decoders DA and DB, at appropriate regularly-changing pulse phases $p_1 \ldots p_n$.

Figure 4:
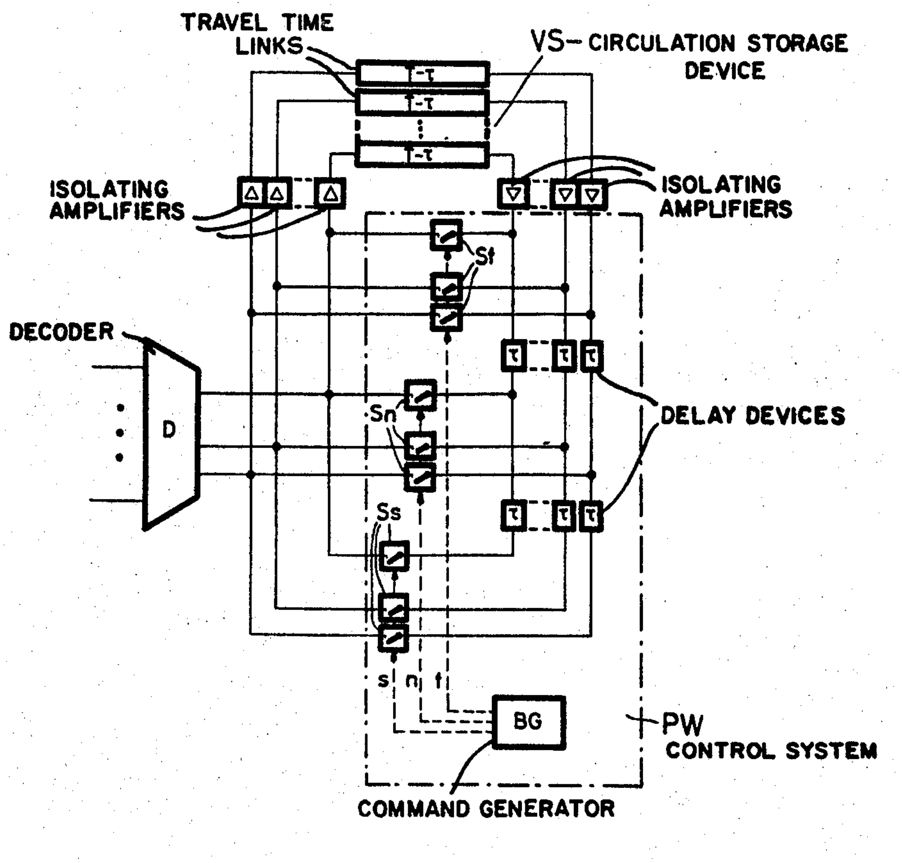
FIG. 4 is a diagrammatic representation of the control system of either of FIG. 2 or 3.

In order that it may be understood how the control system PW can change the pulse phase assignments of the various time channels, reference will now be made to FIG. 4, showing the control system PW in greater detail. The control system PW includes a command generator BG which controls the selection and reregistration of information which circulates in a circulation storage device, whose circulation time equals the system scanning period T. In such fashion each of the items of information stored in the circulation storage device at a certain phase $p_1 \ldots p_n$ relates to an existing connection in a certain time channel $1 \ldots n$. The command generator BG emits regularly-changing commands for the selection of an item of information stored in the circulation storage device in a certain pulse phase, and for the reregistration of this information in either the previous pulse phase, the same pulse phase, or the succeeding pulse phase.

The circulation storage device in which the items of information circulate is identified in FIG. 4 at VS. The circulation storage device VS includes a plurality of parallel travel time links designated $T$—tau, whose travel time equals the minimum length of a channel scanning period $t$. The plurality of parallel travel time links forms, in combination, a suitable travel time link means for the storage of information in parallel code.

The outlet of each travel time line $T$—tau is connected through an isolating amplifier to a different switch S*f*.

The output of each switch S*f* is connected both to the decoder D and, through another isolating amplifier, to the input of the same travel time link *T*—tau.

Each travel time link is also connected through a further pair of delay devices tau to the inlet of a different switch S*s*, with the output of each switch connected to an input of decoder D and, through the same isolating amplifier, to the inlet of the same storage device *T*—tau. Conjunctions between the travel time links tau are connected through switches S*n* to the inlets of the decoder D and the isolating amplifiers, which are in turn connected to the travel time links *T*—tau.

The delay times of the delay devices tau correspond to the length of one pulse phase position, in accordance with the plan that the minimum length of a channel scanning period is shorter than the system scanning period T by the pulse phase length tau, and the maximum length of the channel scanning period is longer than the system scanning period T by the same length.

It will be seen that the switches S*f*, S*n*, and S*s* are all indicated as connected to the command generator BG for actuation thereby. The command generator BG may therefore control which set of switches is operated at each pulse instant and thereby determine whether the pulse circulating in the circulation storage device *T*—tau is directed to the decoder in the same pulse phase, in the immediately preceding pulse phase, or in the immediately succeeding pulse phase. At the same time that the pulse is directed to the decoder, it is reinserted in the travel time link *T*—tau to be retrieved therefrom in the phase indicated by *T*—tau.

Referring again to FIG. 2, the two partial storage devices VSA and VSB will be of the same form as the travel time link storage device VS indicated in FIG. 4. These storage devices, as indicated above, will at any instant contain the coded identifications of the addresses of the various time channel switches whose associated end stations are participating in connections, in the appropriate pulse phase. In successive system scanning periods, as such addresses are retrieved from the storage devices, they are directed through the decoder to actuate the respective time channel switches ZS at phases depending upon the command from the command generator (BG in FIG. 4). They are also simultaneously stored once more in the respective storage device VS. While only two partial storage devices VSA and VSB are indicated in FIG. 2, it should be stated that the connection information storage apparatus would in addition include all further circulation storage devices of the time multiplex telephone system which are necessary for operation of that system. More particularly, the storage devices would contain all the information necessary to make each of the connections which is possible with the system.

Figure 3:
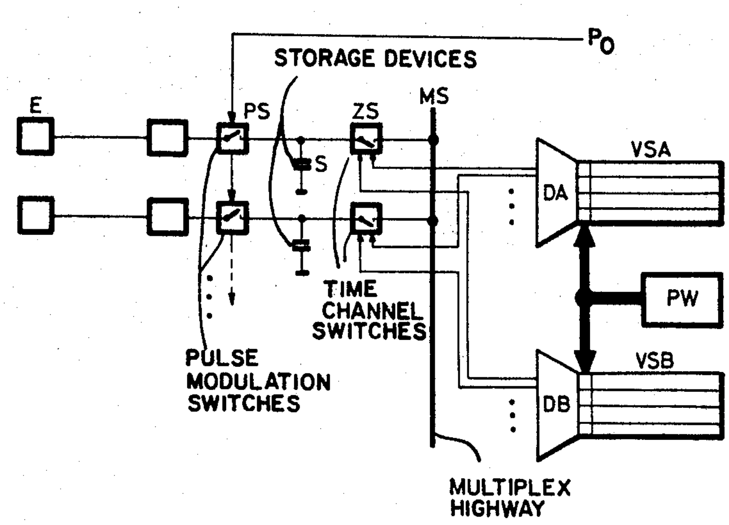
FIG. 3 is a diagrammatic representation of a modified form of the apparatus of the invention.

It will be seen that much the same type of apparatus is illustrated in FIG. 3 and the differences thereover will be described hereinafter. Suffice it to say at this point that the system of FIG. 3 will operate in much the same manner as that of FIG. 2, under the control of the control system PW.

Figure 7:
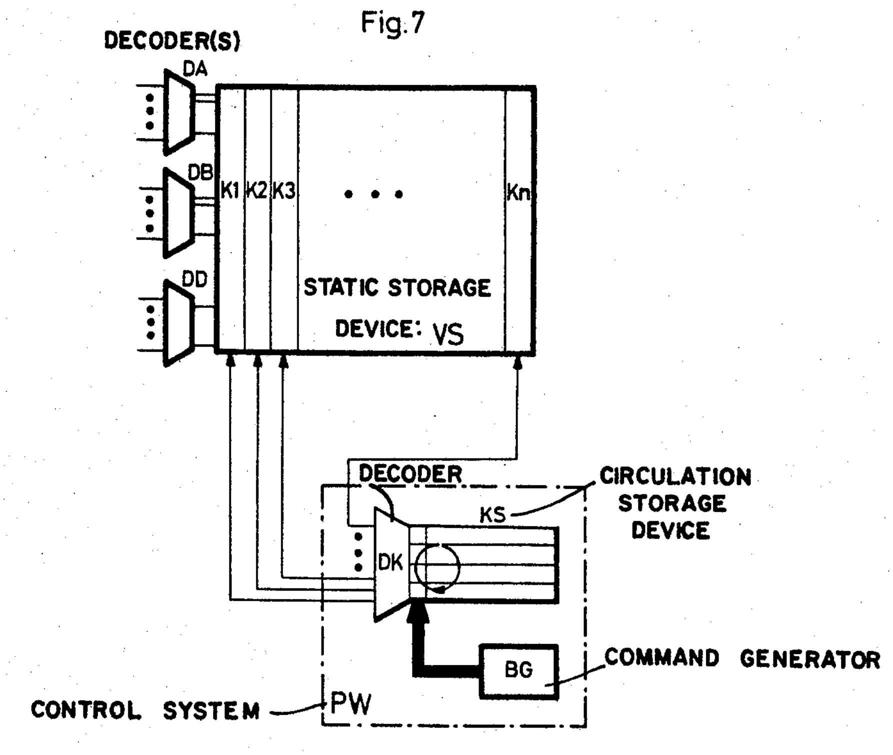
FIG. 7 is a diagrammatic representation of a modification of the apparatus of the preceding figures.

Another type of storage device VS is shown in the system of FIG. 7. In that system, instead of the use of storage devices such as magnetostrictive wires, there is illustrated a static storage device VS which may be of the magnetic core type. In that system a number of storage channels K1 . . . K*n* are provided, each channel being associated with a time channel 1 . . . *n* occupied by a connection. The connection information stored in each channel then identifies the instantaneous connection situation for that channel. Each storage place may then receive at the channel scanning period for the time channel in question, repetitively, a selection command upon whose receipt the connection information stored in that storage place may be selected in disturbance-free manner and, if necessary, conveyed to decoders. Such decoders, of course, can transmit the control commands for the actuation of the time channel switches participating in a connection at that time.

In the system of FIG. 7, two decoders DA and DB are shown, which decoders may correspond to the decoders of the circuit arrangement of FIG. 2. The decoder DD is also shown in FIG. 7 to provide an indication that other decoders than these two may be included in the system.

With the system of FIG. 7, control of the storage device VS is accomplished from control system PW which includes a command generator which regularly emits commands for the selection of information stored at a certain pulse phase in a circulation storage device. In the circulation storage device of FIG. 7 designated as KS there are registered the addresses of the storage places K1 . . . K*n* of the static connection information storage device VS, each command being coordinated or associated with a time channel 1 . . . *n* which is occupied by a connection; that is, in that pulse phase $p_1$ . . . $p_n$ which was last made available for the time channel 1 . . . *n* in question.

A decoder DK is connected to the output of circulation storage device KS, which decoder, upon the emission of the address of a storage place K1 . . . K*n*, provides a command to this particular storage place for the selection of the connection information which is stored there. Thus, the individual storage places K1 . . . K*n* receive, repeatedly, selection commands at the instantaneous phase position to which the time channel in question has been assigned. Such commands are changed in phase position repeatedly in the same fashion as indicated above in conjunction with the apparatus of FIG. 4. The types of information storage device VS and control system PW shown in FIG. 7 are particularly advantageous when the individual connection information or identification requires a large number of information "bits," so that, with the system of FIG. 4, a relatively large number of parallel travel time wires and associated additional delay members and switches would be necessary. In contrasting fashion, in the circulation storage device KS of the arrangement of FIG. 7 only the address of the storage place of the static storage device VS has to be stored in the appropriate phase position, since the actual connection information itself, including the addresses of the time channel switches participating in the connection, and the exchange condition (for example, that a party is dialing, is speaking, was dialed, is busy, or is receiving a callng signal, etc.), are stored in the magnetic core store VS.

It also should be mentioned that it is not essential that parallel storage of the connection information relating to a particular time channel be employed. Rather, the information relating to a connection in a certain time channel may be stored serially in the circulation storage device. In such case a transducer capable of changing from series to parallel form may be installed between the outlet of the circulation storage device and the decoder. Such an arrangement is shown in FIG. 8, wherein the series-parallel translator is designated U and the decoder is designated D.

Figure 8:
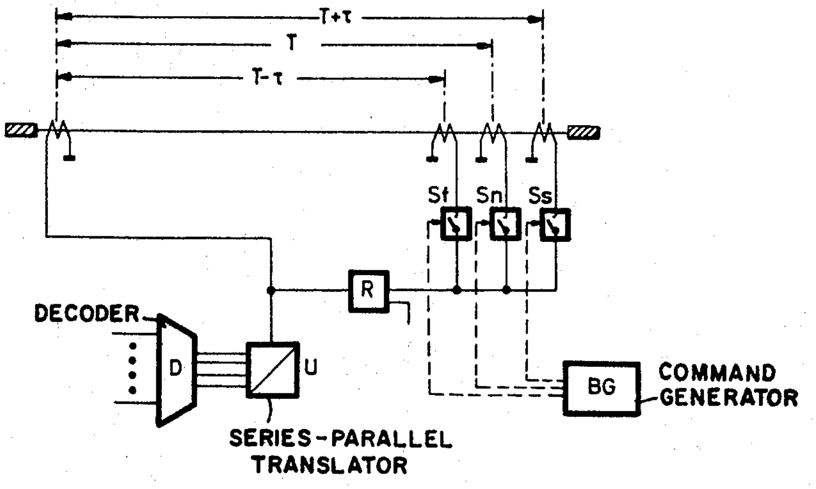
FIG. 8 is a diagrammatic representation of one manner in which the various changes in pulse phase positions of the time channels may be obtained.

FIG. 8 also indicates that the circulation storage device may consist of a travel time link whose travel or transit time equals the maximum length *T*+tau of a channel scanning period and which has taps in those places along the length of the link where the travel tie equals the various possible channel scanning periods *t*. These taps may then be connected through switches actuatable by the command generator BG, to the input end of the travel time link. In the apparatus of FIG. 8 three such taps are provided, such that the respective transit times available between the input end of the link and the taps is equal to *T*—tau, T, and *T*+tau respectively. The three taps may be connected to the other end, or input end, of the travel time wire through the respective switches S*f*, S*n* and S*s*. As indicated, these switches may be operated in the same fashion as the corresponding switches in the apparatus of FIG. 4, under the control of the command generator BG. Thereby, in dependence upon which of the switches S*f*, S*n* and S*s* has been actuated, the information relating to a time channel will be reregistered in the travel time wire at the same time, at a preceding pulse time, or at a succeeding pulse time.

Parallel storage may also be provided with travel time wires of the type shown in FIG. 8, if, instead of a single travel time wire, a plurality of parallel-arranged wires is employed. In such case the maximum pulse frequency capability only has to be as large as that of the system clock pulses, for the time multiplex system, rather than the relatively high frequency wire necessary in the apparatus of FIG. 8.

Returning now to the apparatus shown in FIGS. 2 and 3, the outputs or outlets of decoders DA and DB are connected to the outlets of the various multiplex switches ZS and the command for actuation of such switch goes out from the decoder to the selected switch under the control of the control system, and the indication of the address of that switch provided by the storage device. In the system of FIG. 2, the pulse modulation is effected simultaneously with the change in pulse phase positions of the various time channels, as described. This of course has the advantage that the time channel switches which are in themselves necessary for a time multiplex communication system, even without the scheme of the present invention, can be utilized to effect this scheme. Consequently, essentially only the addition of the control system PW is necessary, a single such control being operable for both calling and called parties to make their connections to the multiplex highway.

It has already been mentioned that the maximum deviation between the instantaneous channel scanning period $t$ and the system scanning period T should be as small as possible to minimize spurious signals caused by such deviations. Such spurious signals can be occasioned in particular by the fact that the reactance networks contained in connection path leading from one end station E to another end station, are designed in accordance with the system scanning period T. However, when the instantaneous channel scanning period $t$ of the particular channel occupying the connection does not coincide with that system scanning period T, the reactance networks will possess energy conditions at the end of the channel scanning period which are different than those at the end of the system scanning period. Such differences can operate like an additional amplitude modulation of the transmitted signals and thereby cause spurious signals. To avoid an adverse influence upon the signal transmission beyond an admissible degree, the maximum deviation of the instantaneous channel scanning period $t$ for each individual time channel from the system scanning period T, is held to a minimum in the manner described.

Another possible cause of disturbances in message transmission, such as spurious signals, is that if the scanning frequency changes, there is present in the signal not only the various harmonics of the original scanning frequency, but also the harmonics of the new scanning frequency. These frequency spectrums overlap, forming new combination frequencies which add or subtract from the transmitted signals and adversely influence them. Nevertheless, if the difference in periods of two successive channel scanning periods is kept to a minimum, for each different time channel, the disturbance vibrations or spurious oscillations will have very small amplitudes and will not be disturbing to an improper degree.

Disturbances of the aforementioned kind may also be avoided if the changes in phase position of the individual time channels 1 . . . $n$ are performed only in connection with the pulse modulation which effects the time multiplex operation. This may be accomplished as shown in FIG. 3 and also in FIG. 9. In the time multiplex telephone exchange system of FIG. 3, the time channel switches ZS leading to the multiplex highway MS are connected to the outputs of the decoders DA and DB to which are switched the outputs of the information storage devices VSA and VSB. These time channel switches ZS switch to the multiplex highway MS at regularly changing pulse phases $p_1 \ldots p_n$ respective energy storage devices S. However, the end stations E are not connected to the multiplex highway MS simultaneously with actuation of the time channel switches ZS, but rather are connected all at the same phase to the energy storage devices S. As indicated, this phase may be the pulse phase $p_0$, so that each of the end stations is simultaneously connected to its own fixedly-associated energy storage device S (which may be a capacitor or other appropriate storage device). Then, the energy storage devices, rather than the end stations themselves, are connected at the pulse phases controlled by the control system PW to the multiplex highway.

Figure 9:
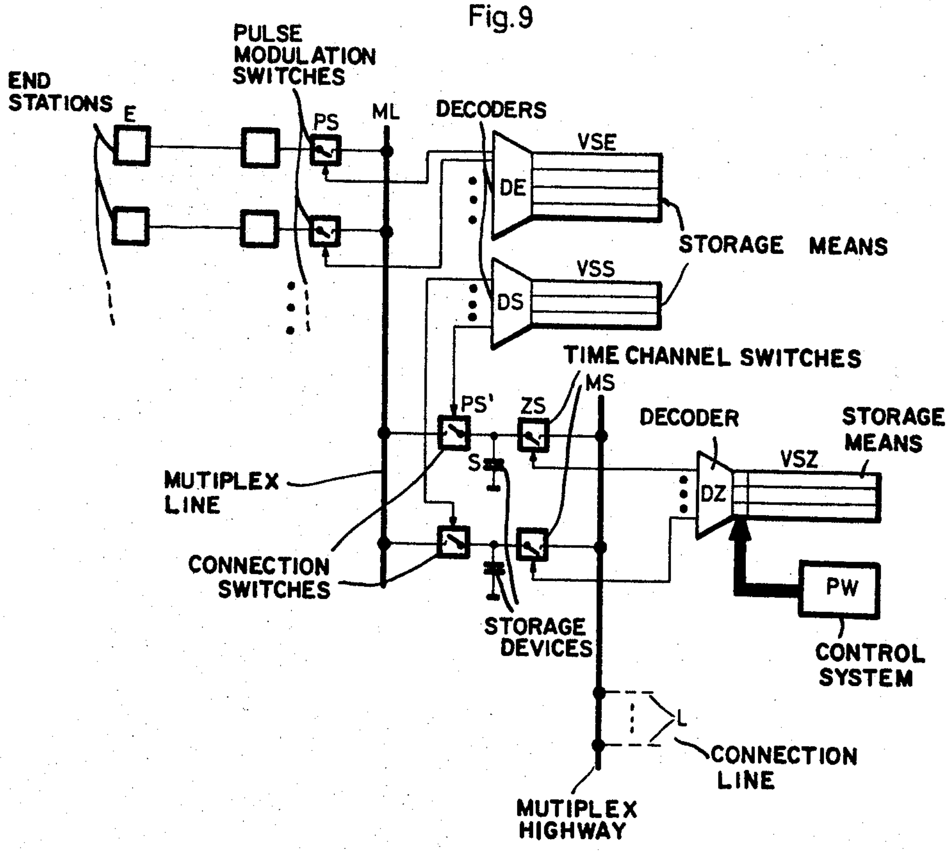
FIG. 9 is a diagrammatic representation of a further modification of the apparatus of the invention.

A somewhat different time multiplex system employing energy storage devices is shown in FIG. 9. In this case, a reduction in energy storage devices is achieved by elimination of the provision of one such device for each end station. In the apparatus of FIG. 9, the energy storage devices S, rather, are fixedly assigned to the connections.

The pulse modulation switches PS of the end stations E connect those stations to a multiplex line ML under the control of a decoder DE supplied with connection information from a storage device VSE. The multiplex line ML is in turn connected by synchronously-operated connection switches PS′ to energy storage devices S, these switches being operated by the outputs of a decoder DS switched to the output of an address circulation storage device VSS. In other words, the decoder DE will switch on the connection switches PS, and at the same time decoder DS will switch on corresponding connection switches PS′, so that the end stations will be connected to the appropriate storage devices.

The storage devices S are then connected to the multiplex highway MS through operation of multiplexing switches ZS, controlled from decoder DZ. The decoder DZ of course has its connection identification information switched to it from the circulating storage device VSZ under the control of the control system PW. The control system will of course work in the manner already described to connect the switches ZS to the multiplex highway in the appropriate pulse phases $p_1 \ldots p_n$, with the phase positions of the different time channels continuously changing in the manner described.

Transmission lines may be connected to the multiplex highway MC and can also be collected into a joint transmission line to whose other end time channel switches are provided in a corresponding circuit arrangement. Such switches will of course be actuated synchronously with the time channel switch ZS of FIG. 9, with which they are jointly participating in a connection.

The time multiplexing system shown in FIG. 9, can, for example, be provided for a preferred group of parties of a larger time multiplex telephone exchange system whose central office may be connected to the preferred group of party end stations E, and more particularly to their multiplex highway MS, by way of a connection line L. It is also indicated in FIG. 9 that the connection line L can branch out into several transmission lines connected to the multiplex highway MS, in a manner shown for example in application Ser. No. 97,233, filed Feb. 23, 1961, now U.S. Patent No. 3,180,402, assigned to the assignee of the present invention. In such fashion it is possible to provide for a frequency interleaving of channels on the transmission line leading to the central office, of course after insertion of appropriate frequency transforming circuits in these branch lines.

The time multiplex communication system of FIG. 9 of course requires a smaller number of energy storage devices, since only as many storage devices need be provided as the number of connections possible at any one time. On the other hand, with the time multiplex system of FIG. 9, only that intelligible crosstalk caused by the time channel switch ZS, by the multiplex highway MS, the transmission line L, and the thereto-connected central office, if any, may be decreased. The configuration of FIG. 9 is therefore especially advantageous if crosstalk would normally appear between different channels, especially of the transmission line. That is, it is especially advantageous in connection with a transmission system that is subject to bad transmission conditions. In addition, the further advantage of the apparatus of FIG. 9 is in conjunction with frequency bundling or interleaving as indicated in the said application Ser. No. 97,233. When such system is employed, the frequency channels are changed in the same fashion as the pulse phases are changed. This makes possible a reduction in the frequency discrimination characteristics of the frequency filters used therein. However, the merits of such a system will not be further described, since such description is not necessary for the comprehension of the present invention.

Returning now to FIG. 5, the command generator BG of the control system PW shown in, for example FIG. 4, will be further described. It will be recognized that this command generator may also be employed in the systems of FIG. 7 and FIG. 8.

As described above, in conjunction with the other figures, the command generator BG emits, in steady flow, commands for the selection of information stored in the circulation storage device at certain pulse phases, and for the re-registration of this information in a preceding pulse phase, the same pulse phase, or a succeeding pulse phase, depending upon the schedule.

Figure 5:
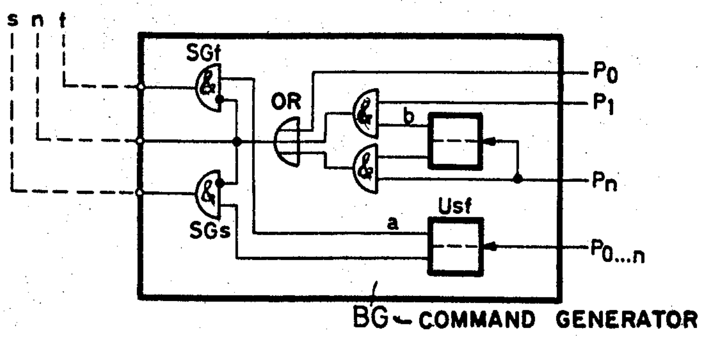
FIG. 5 is a diagrammatic representation of the command generator forming a part of the control system of FIG. 4.

In the command generator of FIG. 5, at one entrance a series of pulses $p_{0 \ldots n}$ is supplied from such as a clock pulse generator (not shown). These clock pulses divide the system scanning period T into the pulse phases $p_0 \ldots p_n$. These pulses are supplied to the input of a reversing flip-flop U*sf* whose outputs are respectively directed to logical ANDs (or AND gates) SG*f* (over line *a*) and SG*s*. The logical ANDs SG*f* and SG*s* control to which outputs *s* or *f*, the phase clock pulses are supplied. A pulse on one of these outputs reflects a control command for selection and re-registration in the succeeding pulse phase, while a pulse on the other output reflects the same thing for the preceding pulse phase.

The logical ANDs SG*f* and SG*s* in effect interrupt the sequence of command pulses supplied to the outputs *s* and *f* during the first pulse phase $p_1$ and during the last pulse $p_n$, as well as for the pulse phase $p_0$ to which no time channel is assigned. In such cases the commands are conveyed to the output *n*. A pulse on the output *n* reflects a command for the selection and re-registration at the same pulse phase $p_1$, $p_n$ or $p_0$.

The blocking of the clock pulses by the logical ANDs SG*f* and SG*s* is achieved during these particular pulse phases by the OR circuit, indicated in conventional manner. As indicated, one of the inputs to the OR circuit is the pulse phase $p_0$. The pulses $p_1$ and $p_n$ are not, however, directly connected to the OR circuit, but rather are connected in different cycles through the use of logical ANDs to whose other inputs are supplied, in alternate cycles, the outputs of a reversing flip-flop which is driven by the pulse phase $p_n$.

Figure 6:
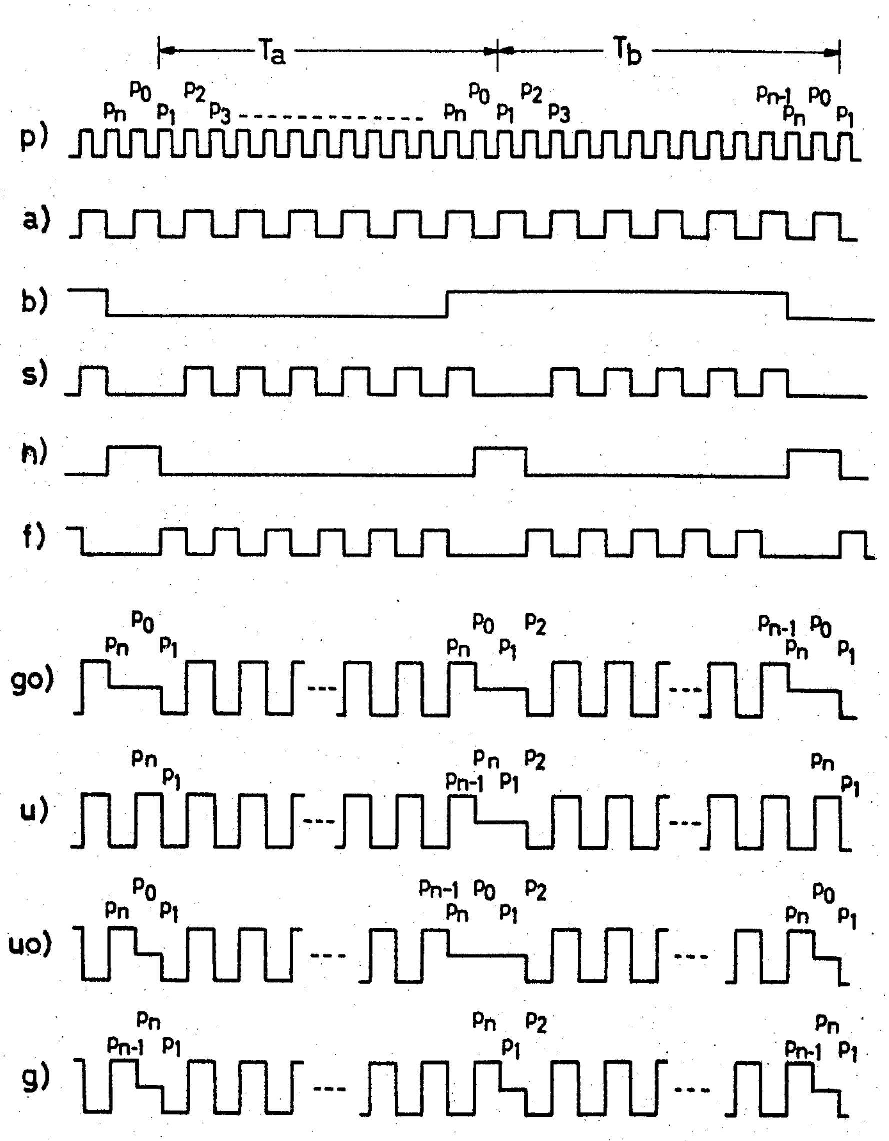
FIG. 6 is a waveform representation of the waveforms at various points in the apparatus of the various other figures.

The manner of operation of the command generator of FIG. 5 may be more easily understood from reference to FIG. 6. In the waveform of FIG. 6*p*, the clock pulses for two successive system scanning periods T*a* and T*b* are shown. As indicated above, these pulses are conveyed to the inputs of the command generator BG. In FIG. 6*a* there are shown the pulses available at the output line *a* of the flip-flop U*sf* and therefore directed to one input of the logical AND SG*f*. It will be obvious that these pulses are in half frequency with respect to the clock frequency. Of course the pulses at the other output of the reverser U*sf*, which are supplied to the AND SG*s*, are reversed in phase, and at the same frequency as the pulses supplied along line *a*.

FIG. 6*b* shows the pulses available at the output *b* of the flip-flop, and indicates reversal of the pulse in successive system scanning periods T*a* and T*b*.

As a result of these various control pulses, there are supplied the output pulses from the command generator along lines *s*, *n* and *f*, and which are shown in lines FIG. 6*s*, FIG. 6*n*, and FIG. 6*f*, respectively. It is evident from these lines that a command pulse appears along command line *n* at pulse phase $p_0$ during each system scanning period, and also during pulse phase $p_1$ during alternate scanning periods T*b*, while pulses appear at phase $p_n$ in these same alternate scanning periods. During the remaining pulse phases, control commands appear alternately at the control outputs *s* and *f* of the command generator.

The separately-shown signal conditions of lines FIGS. 6*f*, 6*n* and 6*s* are shown together in FIG. 6 go in a slightly different manner of representation. It is evident from this representation that alternate pulses appear on lines *f* and *s*, respectively, to decrease and increase the channel scanning period *t*. As a result, the time channels are assigned to successively increasing or decreasing pulse phases, with the exception of those channels first stored in pulse phase $p_1$ and $p_n$, in which case the channel scanning period remains the same for two successive system scanning periods.

A control command pattern of the type shown in FIG. 6 go can be produced with the command generator shown in FIG. 5 and thereby the regular alternation of the phase position changes, with succeeding time channel number, can be obtained at the regularity described above in conjunction with FIG. 1*b*.

The control command pattern described above is of course based on the supposition that there is an even number *n* of pulse phases $p_1 \ldots p_n$ to be occupied by the time channels, and that, in addition, a pulse phase $p_0$ is provided and is not included in the exchange of pulse phases to which the time channels are supplied. However, it is also possible, both in the case of an odd number *n* of pulse phases $p_1 \ldots p_n$, and in the omission of the pulse phase $p_0$, to achieve such a regular pulse phase change so that for each time channel 1 . . . *n*, the instantaneous channel scanning periods *t* are either of the same length as the preceding channel scanning period, are shorter by the time period of a pulse phase (or at least the interval between initiation of successive pulse phases), or are longer than the preceding channel scanning period by the same amount, in the same manner as hereinbefore described.

If there is an even number *n* of the pulse phases $p_1 \ldots p_n$ to which the various time channels may be assigned, but without a special pulse phase (such as $p_0$) to which channels are not assigned, the system clock pulses conveyed to the command generator (such as BG in FIG. 5), which divide the system scanning periods T into pulse phases $p_1$, are transmitted alternately by way of a reverser or flip-flop to one or the other of two command outlets. At such outlets, such as *s* and *f* in FIG. 5, the pulses represent control commands for the selection and re-registration in the respective preceding and succeeding pulse phases. However, this system must also provide for the blocking of pulses in each pulse train, but such as carrier circuits (for instance, logical AND and OR circuits), for the first pulse phase $p_1$ which may be occupied by a time channel 1 . . . *n* in every second system scanning period T*b*. Furthermore, the last pulse phase $p_n$ of every second system scanning period T*b* must also be blocked and these blocked pulses be conveyed to a third command outlet (such as *n* in FIG. 5), where they represent control commands for the selection and re-registration of the respective time channels in the same pulse phase. With a command generator designed in such fashion, one would obtain the control command pattern shown in FIG. 6*g*.

Normally, for a time multiplex system having an even number *n* of pulse phases $p_1 \ldots p_n$, included in the regular system of exchange of pulse phases, with or without an additional pulse phase $p_0$, it is true that the command generator during a system scanning period T*a*, beginning with the first and ending with the last phase of pulse phases $p_1 \ldots p_n$ to which a time channel 1 . . . 3 may be assigned, alternately emits a command for the selection and re-registration of the time channel at the preceding pulse phase and at the succeeding pulse phase. In similar fashion, during the next system scanning period T*b*, beginning with the second and ending with the next-to-the-last pulse phase $p_2$ or $p_{n-1}$, of the pulse phases which may be occupied by a time channel 1 . . . *n*, the command generator alternately emits a command for the selection and re-registration at the preceding pulse phase and a command for the selection and re-registration of the time channel at the succeeding pulse phase. Further, during the remaining pulse phases, that is, pulse phases $p_1$ and $p_n$ of every second system scanning period T*b* (and in case a pulse phase $p_0$ is provided, for that phase also), the command generator emits a command for the selection and re-registration of the time channel in the same pulse phase.

If, in contrast, the time multiplex system possesses an odd number *n* of pulse phases $p_1 \ldots p_n$ which are involved in the exchange of pulse phases, it will usually be that the command generator, during a system scanning period $T_a$ beginning with the first and ending with the next-to-the-last pulse phase $p_1$ or $p_{n-1}$, to which the time channels 1 . . . *n* may be assigned, alternately emits a command for the selection and re-registration in the preceding pulse phase, and for the selection and re-registration in the succeeding pulse phase. In similar fashion, in the succeeding system scanning period T*b*, beginning with a second and ending with the last pulse phase $p_2$ or $p_n$, the command generator will similarly emit commands for the selection and re-registration in the preceding pulse phase, and in the succeeding pulse phase. In addition, during the remaining pulse phases, such a generator will emit a command for the selection and re-registration in the same pulse phase.

If an additional pulse phase is provided in an odd-numbered pulse phase system, such additional pulse phase not being involved in the exchange in pulse phases, the command generator will be designed so that it conveys the system clock pulses provided to it through a reverser alternately to one and the other of the two command exits. At such exits, the pulses will represent control commands for selection and re-registration of the time channels in the preceding and the succeeding pulse phases. Further, in such a system, the conveyance of pulses from the input to the output of the command generator will be blocked by various suitable circuits in every second system scanning period for the first pulse phase $p_1$, as well as for the last pulse phase $p_n$ of the preceding system scanning period $T_a$ which precedes the blocked first pulse phase. These blocked pulses will then be conveyed to a third command outlet (such as *n* in FIG. 5), where they represent control commands for the selection and re-registration of the time channels in the same pulse phase $p_1$ or $p_n$. The resulting pattern will be that shown in FIG. 6*u*.

If, an addition to the odd number *n* of pulse phases $p_1 \ldots p_n$ which may be occupied by time channels, a pulse phase $p_0$ is provided, which pulse phase is not included in the pulse phase change system, then the command generator will again include a reverser through which the clock pulses will be conveyed alternately to one and the other of the two command exits. At those exits the pulses will be control commands for the selection and re-registration of the time channels in the preceding and the succeeding pulse phases, respectively, except that the conveyance of control pulses will be blocked by various appropriate circuits for the first pulse phase $p_1$ which may be occupied by a time channel, in every second system scanning period $T_b$, and both pulse phases immediately preceding it; that is, the pulse phase $p_n$ of the preceding system scanning period $T_a$, and the pulse phase $p_o$, will both be blocked from the two command outlets referred to, Moreover, the pulse phases which are blocked will be conveyed to a third command outlet in which they represent control commands for selection and re-registration of the time channels in the same pulse phase. The control command pattern shown in FIG. 6*uo* will result from such a system.

The command generators described above will cause an occupation of the pulse phases $p_1 \ldots p_n$ by the individual time channels 1 . . . *n* in a succession according to the scheme shown in FIG. 1b, which succession is repeated in the changing period which equals 2n multiplied by the system scanning period T. However, it is also possible to employ a command generator which is constructed in such fashion that its commands for selection of information stored in the circulation storage device are emitted at one particular pulse phase and the commands for re-registration at an earlier pulse phase, at the same pulse phase, or at a later pulse phase, the command pulses being in a succession which is repeated with another change period. If, for the storage of the connection information, a static information storage device is provided which operates in the manner shown in FIG. 7 such that storage places *k*1 . . . *kn* are assigned to time channels 1 . . . *n* occupied by a connection, then differing from the conditions shown in FIG. 7, it is also possible that the control system of such apparatus be operated with a random phase generator which provides pulses at its outlets which regularly succeed each other in statistical distribution. The outlets of this random generator may then be connected to the inquiry entrances or inlets of the individual storage places K1 . . . K*n* of the static information storage device VS (see FIG. 7). As a result, the pulses appearing at the outlets of the random generator represent commands for the selection of that connection information which is stored in the particular storage places K1 . . . K*n* to which those outlets are directed. If, in the course of each system scanning period, control pulses appear successively at the various generator outlets, in statistical distribution, a regular exchange of the different phase positions of the individual time channels is achieved. Since a system employing statistically random assignment of the individual pulse phases will permit larger differences between successive channel scanning periods, the exchange of such position may follow the pulse modulation itself. Since such procedure was described in detail above, it need not be repeated at this point.

It will be evident that many minor changes may be made in the apparatus described herein, without departure from the scope of the invention. Accordingly, the invention is not to be considered limited by such description, but only by the scope of the appended claims.

We claim:

1. In a pulse modulation time multiplex communication system wherein the individual channels of a group of *n* successive time channels are assigned to different pulse phase positions during each system scanning period defined by appearance of all the pulse phases, the method of minimizing intelligible crosstalk between different individual channels which comprises, changing the relative phase positions to which the time channels are assigned, in successive system scanning periods, to cause the time channels of the group of *n* successive time channels to appear in all $n(n-1)$ possible channel combination pairs in such manner that at least $n(n-3)$ channel combination pairs appear at equal frequency of occurrence and the remaining, comprising at most 2*n*, channel combination pairs appear at a greater frequency of occurrence as immediately adjacent time channels.

2. The method of claim 1 in which the pulse modulation of messages precedes the change in the relative phase positions to which the time channels for those messages are assigned.

3. The method of claim 1 in which the pulse modulation of messages and the change in the relative phase positions to which the time channels for those messages are assigned, take place simultaneously.

4. The method of claim 1 in which the changing step is undertaken in such fashion that the average scanning period for each time channel is substantially equal to the system scanning period.

5. The method of claim 4 in which the pulse succession period between successive system scanning periods in which the time channels have the same relative phase positions is an even-numbered multiple of the length of the system scanning period.

6. The method of claim 4 in which all instantaneous channel scanning periods for all time channels are different in length from the system scanning period by no more than the time interval between the two instantaneously adjacent time channels.

7. The method of claim 6 in which successive channel scanning periods for each time channel are one of (a) the same length; (b) different lengths with one longer than the adjacent one by said time interval; and (c) different lengths with the said one shorter than the said adjacent one by said interval.

8. The method of claim 4 in which the pulse phases $p_1$ to $p_n$ in the system scanning period are occupied by the individual time channels 1 to $n$ in statistical sequence.

9. In a pulse modulation time multiplex communication system wherein different messages between different sets of stations are assigned to $n$ different pulse phase positions during system scanning periods defined by appearance of all the pulse phases, the method of minimizing intelligible crosstalk between different messages which comprises, repetitively changing the relative phase positions to which the time channels are assigned in successive scanning periods in accordance with the following rules:

(a) as to one set of alternate successive time channels 1 to $n$, respectively, assigned to pulse phases $p_1$ to $p_n$ during one system scanning period, successively increasing the number of the pulse phase to which the time channels between 2 and $n-1$ are assigned, in successive system scanning periods, until the channel reaches pulse phase $p_n$;

(b) as to the other set of alternative successive time channels successively decreasing the number of the pulse phase to which the time channels between 2 and $n-1$ are assigned, in successive system scanning periods, until the channel reaches pulse phase 1; and (c) repeating one time the assignment of each time channel in pulse phases 1 and $n$, as it reaches those phase positions, and then reversing the direction of change in pulse phase assignment of that time channel in the following system scanning period.

10. The method of claim 9 in which the total number of phase positions includes phase position $p_0$ to which no message is assigned.

11. In a pulse modulation time multiplex communication system including a multiplex highway to which different sets of end stations are connected by time channel switches during different pulse phase positions of a scanning period defined by appearance of all the pulse phases wherein $n$ time channels are provided for time multiplex communication, connection information storage means equal in number to the number of time channels and operable to store the addresses of time channel switches then participating in connections, decoding means operable upon receipt of addresses of time channel switches to operate those switches, and a control system operable to connect said storage means to said decoding means to read out the addresses of the channel switches in changing relative phase positions of $n(n-1)$ different possible combination pairs of time multiplex channels in successive system scanning periods to effect the establishment of time multiplex communication channels in such manner that at least $n(n-3)$ channel combination pairs appear at equal frequency of occurrence and the remaining, comprising at most $2n$, channel combination pairs appear at a greater frequency of occurrence as immediately adjacent time channels.

12. The apparatus of claim 11 including at least one circulation storage device in which are stored, in the pulse phase last occupied by a connection, the addresses in said storage means in which information concerning that connection is stored, second decoding means operable upon receipt of the addresses of said storage means to key out of the addressed positions of said storage means to said first-mentioned decoding means the identifications of the time channel switches, said control system being operable to connect said second decoding means to said circulation storage device in said different pulse phases.

13. The apparatus of claim 11 including an energy storage device for at least each connection existing in the same pulse phase, and means for connecting each said end station to an energy storage device cyclically, said control system being operable to connect the time channel switches to said energy storage device.

14. The apparatus of claim 13 in which each end station has a different energy storage device associated therewith, said connecting means being operable to connect each end station to its own energy storage device during a fixed pulse phase.

15. The apparatus of claim 13 in which a plurality of end stations are connectable to each energy storage device by said connecting means.

16. In a pulse modulation time multiplex communication system including a multiplex highway to which different sets of end stations are connected by time channel switches during different pulse phase positions of a scanning period defined by appearance of all the pulse phases, connection information storage means operable to store the addresses of time channel switches then participating in connections, said storage means including at least one circulating storage device operable cyclically to furnish at its output the information stored therein, at the system scanning period, decoding means operable upon receipt of addresses of time channel switches to operate those switches, and a control system operable to connect said storage means to said decoding means to read out the addresses of the channel switches in changing phase positions in successive scanning periods, said control system including a command generator operative to cause selection of connection information stored in said storage device in a certain pulse phase, and said command generator being operative to cause re-registration of the selected information, at different times, in the same pulse phase, a preceding pulse phase, and a succeeding pulse phase.

17. The apparatus of claim 16 in which said circulating storage device includes a travel time link whose travel time equals the minimum length of a channel scanning period, a pair of delay devices each operable to delay a received pulse by the difference between the system scanning period and the minimum channel scanning period, and three switches connected between the output and the input of said travel time link in three different circuits, the first circuit including only a switch, the second circuit including one of said delay devices and another switch, and the third circuit including both of said delay devices and the third switch, said switches being connected to said command generator for operation thereby.

18. The apparatus of claim 17 in which said storage device includes a plurality of parallel-operated travel time links for storing connection information in parallel.

19. The apparatus of claim 16 in which each said circulating storage device includes a travel time link whose travel time equals the maximum length of a channel scanning period, said link having taps therealong at positions such that the travel time thereto equals, respectively, the system scanning period and the minimum channel scanning period, and switches connected between opposite ends of said travel time link and between each of said taps and the input end of the link, said switches being connected to said command generator for operation thereby.

20. The apparatus of claim 19 in which storage connection information is to be stored in said travel time link serially, and including a translating device connected to said travel time link for changing serially-arriving information into parallel form.

21. The apparatus of claim 16 in which said command generator is operable, during one system scanning period, beginning with the first ($p_1$) and ending with the last pulse phase ($p_n$) occupied by a time channel, and, during the next system scanning period beginning with the second ($p_2$) and ending with the next-to-the-last pulse phase ($p_{n-1}$) occupied by a time channel, alternately to emit a command for selection and re-registration in the preceding and the succeeding pulse phase, and is further operable during the remaining pulse phases to emit a command for selection and re-registration in the same pulse phases.

22. The apparatus of claim 16 in which said command generator is operable during one system scanning period beginning with the first ($p_1$) and ending with the next-to-the-last pulse phase ($p_{n-1}$) occupied by a time channel, and, during the next system scanning period beginning with the second ($p_2$) and ending with the last pulse phase ($p_n$) occupied by a time channel alternately to emit a command for selection and re-registration in the preceding and the succeeding pulse phases, and is further operable during the remaining pulse phases to emit a command for selection and re-registration in the same pulse phase.

23. The apparatus of claim 22 in which said command generator includes apparatus supplied with clock pulses dividing each system scanning period into pulse phases, a pair of outputs, means for directing alternate pulses from the input to different ones of the pair of outputs, and means for blocking pulses corresponding to said re-registration in the same pulse phase, said means providing said blocked pulses at a third output.

References Cited

UNITED STATES PATENTS

| | | | |
|---|---|---|---|
| 3,042,752 | 7/1962 | Fulmer | 179—15 |
| 3,233,042 | 2/1966 | Longton | 179—15 |
| 3,324,246 | 6/1967 | Feder | 179—15 |

ROBERT L. GRIFFIN, *Primary Examiner.*

RICHARD MURRAY, *Assistant Examiner.*